(12) United States Patent
Han

(10) Patent No.: US 9,456,215 B2
(45) Date of Patent: Sep. 27, 2016

(54) IMAGE TRANSMISSION APPARATUS IN DIGITAL TV BROADCASTING

(71) Applicant: KANGWON NATIONAL UNIVERSITY University-Industry Cooperation Foundation, Chuncheon-si, Gangwon-do (KR)

(72) Inventor: Chan Ho Han, Seongnam-si (KR)

(73) Assignee: KANGWON NATIONAL UNIVERSITY University-Industry Cooperation Foundation, Chuncheon-Si, Gangwon-Do (KR)

( * ) Notice: Subject to any disclaimer, the term of this patent is extended or adjusted under 35 U.S.C. 154(b) by 97 days.

(21) Appl. No.: 14/176,692

(22) Filed: Feb. 10, 2014

(65) Prior Publication Data

US 2015/0131005 A1  May 14, 2015

(30) Foreign Application Priority Data

Nov. 8, 2013 (KR) ........................ 10-2013-0135300

(51) Int. Cl.
*H04N 7/08* (2006.01)
*H04N 5/44* (2011.01)
*H04N 19/463* (2014.01)
(Continued)

(52) U.S. Cl.
CPC .............. *H04N 19/463* (2014.11); *H04N 5/38* (2013.01); *H04N 7/025* (2013.01); *H04N 7/08* (2013.01); *H04N 19/44* (2014.11); *H04N 19/12* (2014.11); *H04N 19/156* (2014.11)

(58) Field of Classification Search
CPC ...... H04N 7/08; H04N 19/12; H04N 19/156; H04N 19/44

USPC ................ 348/473, 465, 563, 564, 913, 553
See application file for complete search history.

(56) References Cited

U.S. PATENT DOCUMENTS

2009/0252231 A1  10/2009  Tahara
2013/0236046 A1*  9/2013  Nallusamy et al. .......... 382/100

FOREIGN PATENT DOCUMENTS

EP        2107806 A1    10/2009

OTHER PUBLICATIONS

Anonymous, A/63, Standard for Coding 25/50 Hz Video, Advanced Television Systems Committee, 1997, 9 pages.
(Continued)

*Primary Examiner* — Jefferey Harold
*Assistant Examiner* — Jean W Desir
(74) *Attorney, Agent, or Firm* — Harness, Dickey & Pierce, P.L.C.

(57) ABSTRACT

Provided is an image transmission apparatus in digital TV broadcasting, including: a first converter which converts added data, which are to be inserted into an image, into a pixel block; a border extender which adds an extended border area to an image area to extend the image in video data and inserts the converted added data into the extended border area; a video encoder which encodes the video data into which the border extender inserts the added data; a video decoder which decodes the video data encoded by the video encoder; and a second converter which converts the added data which are inserted as a pixel block in the video data decoded by the video decoder into original data. Accordingly, in digital TV broadcasting such as HD TV an UDTV, the added data are inserted into a hidden area, so that it is possible to transmit various types of information including contents and copyright without a deterioration in image quality.

5 Claims, 9 Drawing Sheets
(1 of 9 Drawing Sheet(s) Filed in Color)

(51) Int. Cl.
*H04N 7/025* (2006.01)
*H04N 19/44* (2014.01)
*H04N 5/38* (2006.01)
*H04N 19/12* (2014.01)
*H04N 19/156* (2014.01)

(56) References Cited

OTHER PUBLICATIONS

European Search Report in accordance with EP application No. 14153121, issued Nov. 21, 2014.

\* cited by examiner

IMAGE TRANSMISSION APPARATUS IN DIGITAL TV BROADCASTING

CROSS-REFERENCE TO RELATED APPLICATIONS

This application is based upon and claims the benefit of priority from Korean Patent Application No. 10-2013-0135300 filed on Nov. 8, 2013, the entire contents of which are incorporated herein by reference.

BACKGROUND OF THE INVENTION

1. Field of the Invention

The present invention relates to an image transmission apparatus in digital TV broadcasting, and more particularly, to a technique for transmitting copyright and added data by using a hidden area in digital TV broadcasting.

2. Description of the Related Art

In a digital broadcasting system, all procedures are executed with digital signals, so that high image quality can be implemented and high sound quality can be implemented in a wide range of from a lower sound level to an upper sound level. Therefore, the digital broadcasting system has been applied widely and actively to terrestrial broadcasting, satellite broadcasting, cable TV broadcasting, and the like.

The United States of America employed an 8-VSB (vestigial side band) transmission system as a standard of the terrestrial digital TV broadcasting in 1995, and test broadcasting began in the later half of 1998. South Korea also employed the 8-VSB transmission system as a standard, and the terrestrial digital TV broadcasting has been provided.

In general, the digital TV broadcasting can be performed with a high quality of image, and transmission efficiency is high in comparison to analog TV broadcasting, so that much more amount of information can be transmitted and received. In addition, recently, the United State of America employed ATSC M/H (Mobile/Handheld) broadcasting standard for the digital TV broadcasting using various mobile apparatuses such as PDAs, PMPs, and MP3 players.

In general, in digital TV broadcasting employed by ATSC (Advanced Television Systems Committee) of the United State of America, a terrestrial VSB transmission system is used. In the digital TV system, video data and a synchronization signal are separately transmitted. A receiver side needs to accurately detect a position of the synchronization signal from the video data. Since the synchronization signal has a function of identifying predefined sections of the video data, it is very important to accurately detect the position of the synchronization signal. In other words, since the synchronization signal is used as a reference of time when other components of the receiver performs signal processing, it is important to accurately detect the synchronization signal at the video data reception stage. In general, a synchronization signal pattern is inserted into the video data in the digital broadcasting signal so that the receiver side can detect the synchronization signal.

In general, in a VSB transmission scheme, a specific synchronization signal pattern is periodically inserted into a datastream (or a bitstream) so that a DTV receiver can easily detect the synchronization signal.

In this case, one datastream is configured as a sequence of data segments of 832 symbols and is divided into a synchronization signal section of 4 symbols and a data section of 828 symbols.

In addition, the synchronization signal section is a 2-level signal of '−1' or '+1', and the data section is an 8-level digital signal.

The transmission systems of a terrestrial digital TV broadcasting are mainly classified into two schemes. The one is the TCM (trellis coded modulation) type 8-VSB transmission system employed in the United State of America and South Korea, and the other is a COFDM (coded orthogonal frequency division multiplexing) transmission system employed in Europe.

In domestic broadcasting systems providing terrestrial digital TV broadcasting, video is compressed by using an MPEG-2 video at the Main Profile@High Level (MPEG-2MP@HL) compression method, and audio is compressed by using a Dolby-AC3 method.

As representative methods of compressing full HD (high definition) video images, there are an MPEG2MP@HL scheme used in the digital TV broadcasting and H.264 which is an Internet moving picture compression standard used for Youtube, IPTV, and the like. The full HD video image is configured with effective pixels of 1920×1080 (horizontal pixels×vertical lines). In the MPEG2MP@HL scheme and the H.264 full HD video compression method, a block is used as a minimum unit, but a slice and a macroblock is used as a basic unit. Therefore, an input image for full HD video compression needs to be 16 times of the basic unit of the slice and the macroblock. This is expressed by the following Equation.

$$\text{Active Pixels}_{Total} = n \times 16$$

$$\text{Active Lines}_{Total} = n \times 16 \quad \text{[Equation 1]}$$

However, the number of pixels of the full HD image defined according to the MPEG, ATSC, and DVB standards is 1080 lines, which is not 16 times the basic unit of the slice and the macroblock. Therefore, the input full HD image is extended by using a border extender according to a method of extending 8 lines under a frame in the video encoder as illustrated in FIG. 1 in order to satisfy the condition of "16 times".

FIGS. 1A and 1B are views illustrating screens where a border extender for full HD video compression is executed.

FIG. 1A illustrates a screen where a full HD image area is configured with 1920×1080.

FIG. 1B illustrates a screen where an extended border area is added under the full HD image area by extending the image by executing the border extender.

The MSSG (MPEG Software Simulation Group) proposes a method of repeating a final line as a reference. In a real-time encoder used for actual broadcasting, the quality of image at the reception stage can be improved by taking into consideration various digital filters used for a receiver due to complexity of hardware.

FIGS. 2A to 2D are views illustrating examples of screens where extended border areas are added to full HD images in terrestrial DTV broadcasting. In FIGS. 2A and 2B, screens where currently broadcasted terrestrial digital TV programs are received and recorded and restored are illustrated so as to show how to use the extended border area.

FIGS. 2A, 2B, 2C, and 2D are examples of screens of broadcasting systems, KBS, MBC, SBS, and EBS.

Referring to FIGS. 2A to 2D, the broadcasting systems KBS, MBC, and SBS use a border having pixel values of $0_R$, $0_G$, and $0_B$, and the broadcasting system EBS uses a boarder having pixel values of $131_R$, $131_G$, and $131_B$. The values $131_R$, $131_G$, and $131_B$ of the EBS are pixels values having intermediate brightness by taking into consideration gamma values of the receiver. In addition, as a peculiar point, in the case of the SBS, a black line exists in the upper portion of the frame.

However, a technique of transmitting copyright or data of contents to the extended border area as a hidden area in a DTV image screen has not been proposed in the related art.

Korean Patent Application Publication No. 10-2013-0098027 is provided as a cited document.

SUMMARY OF THE INVENTION

The present invention is to provide an image transmission apparatus in digital TV broadcasting, capable of inserting copyright or data into a hidden area of a full HD image and transmitting the copyright or data.

The present invention is not limited to the above-mentioned object, and other objects will be clearly understood from the below description by the ordinarily skilled in the art.

According to the present invention, there is provided an image transmission apparatus in digital TV broadcasting, including: a first converter which converts added data, which are to be inserted into an image, into a pixel block; a border extender which adds an extended border area to an image area to extend the image in video data and inserts the converted added data into the extended border area; a video encoder which encodes the video data into which the border extender inserts the added data; a video decoder which decodes the video data encoded by the video encoder; and a second converter which converts the added data which are inserted as a pixel block in the video data decoded by the video decoder into original data.

In the above aspect, the image may be a full HD TV (high definition television) image. In addition, the extended border area may be a DEHA (DTV Extended border and Hidden Area).

In addition, the video encoder may encode the video data according to an MPEG2MP@HL scheme, and the video decoder may decode the video data according to the MPEG2MP@HL scheme.

In addition, the video encoder may encode the video data in an H.264 scheme, and the video decoder may decode the video data in the H.264 scheme.

In addition, the border extender adds an extended border area under the image area.

In addition, the added data may be VIC (video information copyright). In addition, the video decoder restores the VIC as a QR (quick response) code and allows the QR code together with the image of the video data to be displayed on a screen.

According to the present invention, in digital TV broadcasting such as HD TV an UDTV, the added data are inserted into a hidden area, so that it is possible to obtain an effect of being capable of transmitting various types of information including contents and copyright without a deterioration in image quality. Namely, according to the present invention, added data are inserted into a DEHA, so that it is possible to transmit data on DTV contents and various types of information without a deterioration in image quality and to provide better video and audio qualities.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features and advantages of the present invention will become more apparent by describing in detail exemplary embodiments thereof with reference to the attached drawings in which.

DETAILED DESCRIPTION OF THE INVENTION

Figure 1A:
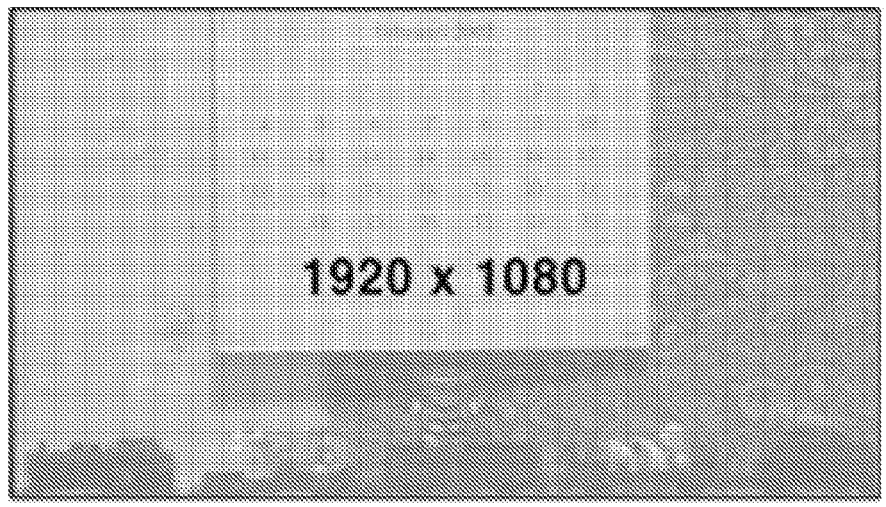
FIGS. 1A and 1B are views illustrating screens where a border extender for full HD video compression is executed.
Figure 1B:
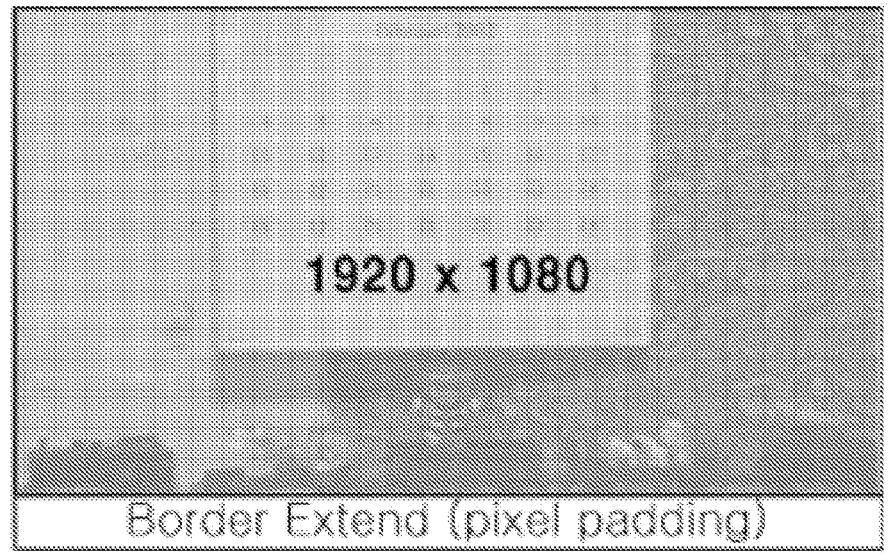
Figure 2A:
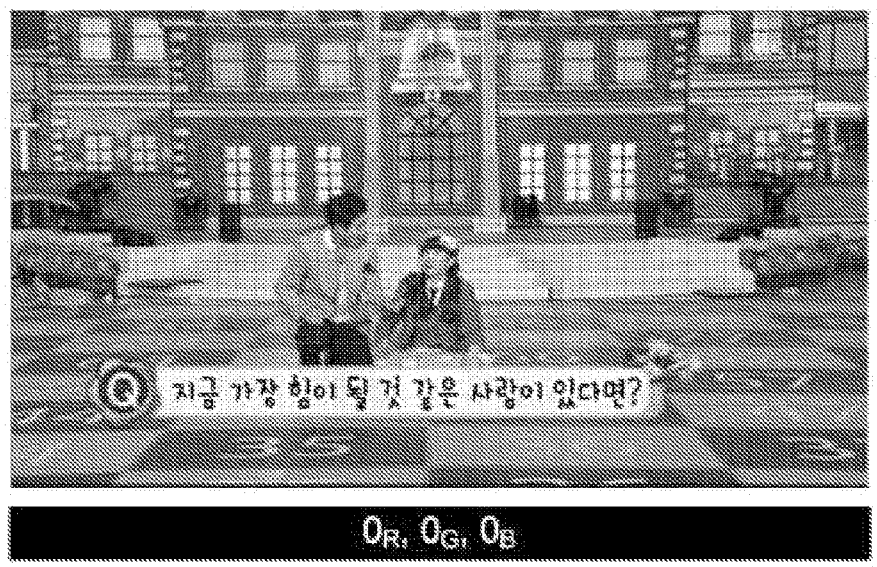
FIGS. 2A to 2D are views illustrating examples of screens where extended border areas are added to full HD images in terrestrial DTV broadcasting.
Figure 2B:
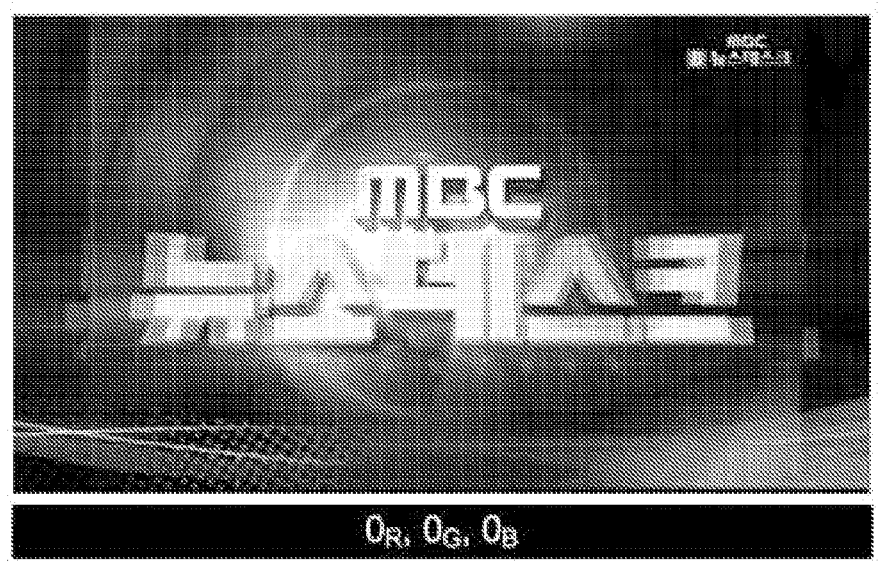
Figure 2C:
Figure 2D:

Hereinafter, embodiments of the present invention will now be described more fully with reference to the accompanying drawings. It should be noted that, it is not intended to limit the present invention to specific embodiments, and all changes, equivalents, and substitutes thereof are included within the scope of the present invention.

Terms used in the application are used for simply explaining specific examples, but it is not intended to limit the present invention. A singular expression includes a plural expression if it has clearly different meaning in context. In addition, in the overall description, terms "to comprise", "to include", and the like denote existence of features, numbers, stages, operations, components, parts, or combinations thereof. Therefore, it should be noted that existence or addition of other features, numbers, stages, operations, components, parts, or combinations thereof is not excluded.

As long as the terms are not defined as different meanings, all the technical and scientific terms used in the present invention has the same meaning as the terms generally understood by the ordinarily skilled in the art. It should be noted that generally-used terms defined in dictionaries have the meaning matching with context meaning in the associated technologies, and as long as the terms are not defined, the terms are not analyzed to have ideal or excessively hypothetical meaning.

In the drawings, the same reference numerals denote the same components, and the description thereof may be omitted. In addition, when it is determined that the invention may become unclear due to detailed description of well-know configurations or functions, the detailed description may be omitted.

Figure 3:
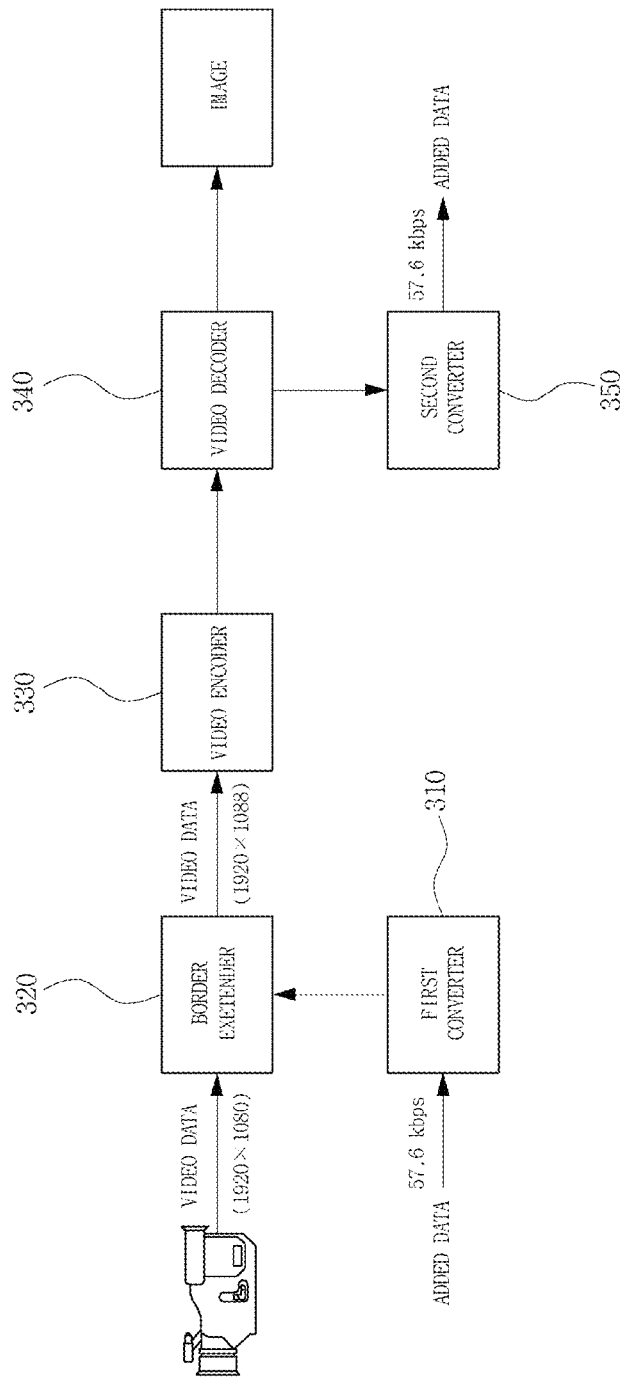
FIG. 3 is a block diagram illustrating a configuration of an image transmission apparatus in digital TV broadcasting according to an embodiment of the present invention.

FIG. 3 is a block diagram illustrating a configuration of an image transmission apparatus in digital TV broadcasting according to an embodiment of the present invention.

Referring to FIG. 3, the image transmission apparatus in digital TV broadcasting according to the embodiment of the present invention is configured to include a first converter 310, a border extender 320, a video encoder 330, a video decoder 340, and a second converter 350.

The first converter 310 converts added data, which are to be inserted into an image, into a pixel block.

The border extender 320 adds an extended border area to an image area to extend the image in video data and inserts the converted added data into the extended border area.

The video encoder 330 encodes the video data into which the border extender 320 inserts the added data.

In the embodiment of the present invention, the video encoder 330 may encode the video data according to an MPEG2MP@HL scheme.

In addition, in another embodiment of the present invention, the video encoder 330 may encode the video data according to an H.264 scheme.

The video decoder 340 decodes the video data encoded by the video encoder 330.

In the embodiment of the present invention, the video decoder 340 may decode the video data according to the MPEG2MP@HL scheme.

In another embodiment of the present invention, the video decoder may decode the video data according to the H.264 scheme.

The second converter 350 converts the added data which are inserted as a pixel block in the video data decoded by the video decoder into original data.

In the embodiment of the present invention, the image may be a full HD TV image. In addition, in another embodiment, the image may be a UHD (Ultra HD) TV image.

The number of scan lines of an HD TV is 1050 or 1250 which is twice larger than the number of scan lines of a general TV, that is, 525 or 625. Therefore, horizontal and vertical resolutions are improved two times, so that the HD TV can implement a bright image like an actual picture.

In addition, in the HD TV, a flicker cross-effect as one of the problems of the general TV broadcasting is improved; a quality of image equivalent to or higher than that of 35 mm movie can be implemented with a wider screen having an aspect ratio of 16:9 than that of an existing screen having an aspect ratio of 4:3; an quality of sound is comparable to that of a CD (compact disk); and a sense of realism is comparable to that of vistavision. In addition, since the HD TV requires for several times the number of channels of the existing TV, the HD TV is appropriate for satellite broadcasting which employs a digital TV scheme and is adaptable to multi-channel broadcasting, and for cable TV broadcasting using optical fibers.

In the embodiment of the present invention, the extended border area may be a DEHA (DTV Extended border and Hidden Area).

In the present invention, the border extender 320 may add the extended border area under the frame of the image area.

The added data may be VIC (video information copyright).

For example, the video data input to the border extender are data corresponding to effective pixels of 1980×1080 in 1920×1080 (horizontal pixels×vertical lines). The border extender 320 adds an extended border area having 8 lines to the video data so as to be suitable for 16 times as units of slice and macroblock. Therefore, a signal output from the border extender 320 becomes video data having a size of 1920×1088. In this case, the added data can be transmitted at a rate of 57.6 kbps.

The present invention proposes a scheme of transmitting address link of homepage or data for preventing falsification and counterfeit by using an extended border area of a full HD image.

The extended border area of a full HD image is configured to have a size of 1920×1088 (pixels×vertical lines). Since image quality may be deteriorated, any arbitrary method cannot be used. In order to prevent a deterioration in image quality, the same value is allocated in units of a block.

In addition, in order to prevent a change in data value caused by a change in pixel value according to quantization of DCE coefficients, a 7-level data transmission system having values of 32_level_1, 64_level_2, 96_level_3, 128_level_4, 160_level_5, 192_level_6, and 214_level_7 is proposed. The maximum data amount which can be transmitted through an extended border area of a full HD image is expressed by the following equation.

$$\text{Total Bits}_{Extended\ Border} = 240_{blocks} \times 7_{levels} = 1680\ \text{bits} = 210\ \text{bytes} \quad [\text{Equation 2}]$$

The data frame is configured and transmitted with reference to a general-purpose digital data reception/transmission method as follows.

Figure 4:
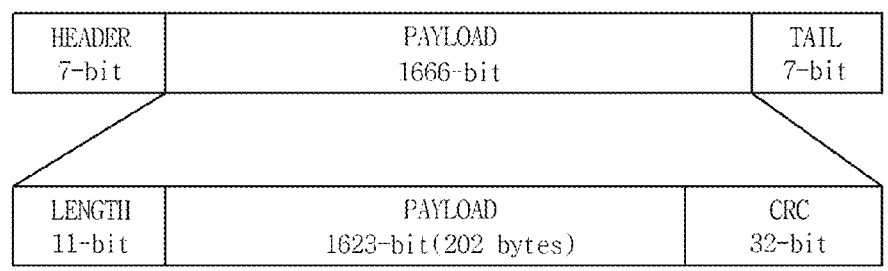
FIG. 4 is a diagram illustrating a structure of a data frame transmitted by the image transmission apparatus in digital TV broadcasting according to the embodiment of the present invention.

FIG. 4 is a diagram illustrating a structure of a data frame transmitted by the image transmission apparatus in digital TV broadcasting according to the embodiment of the present invention.

Referring to FIG. 4, in the case of transmitting alphabet letters and numbers by using ASCII codes in such a frame structure as illustrated in FIG. 4, 7-level data transmission is useful; and in the case of transmitting such general-purpose letters as Unicodes, the number of transmittable letters is decreased.

In the present invention, a QR code data format is used in order to correct a transmission error of data transmitted by using an extended border area of a full HD image.

The QR Code is a 2D symbol developed by Denso Wave Incorporated in Japan. In 1994, Denso Wave announced the release of its QR code for public use without execution of patent right. QR is abbreviated from Quick Response. The QR code has features of high-speed decoding, a large capacity, a large recording amount, a high density, error correction capability, and the like in comparison to an existing barcode. In Japan, the QR code is marked on a book cover so as to search for information on the book. In addition, the QR codes are attached to dishes in a sushi restaurant, or the QR codes frequently appear in streets. The QR codes can be used for displaying information required for daily life, for example, name cards, phone numbers, letters, homepage URL, and the like. In addition, the QR code has an error correction function. Therefore, even in the case where a portion of the QR code is stained or destructed, the data can be restored from the QR code. A maximum 30% of code words the data can be restored in units of code words.

Figure 5:
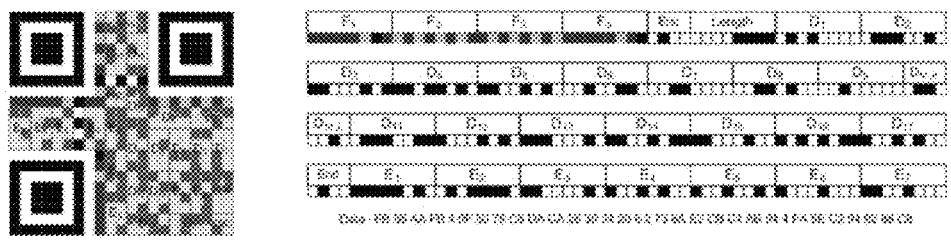
FIG. 5 is a diagram illustrating an example of data for transmitting digital TV broadcasting information by using an extended border area and a QR code in the image transmission apparatus in digital TV broadcasting according to the embodiment of the present invention.

FIG. 5 is a diagram illustrating an example of data for transmitting digital TV broadcasting information by using an extended border area and a QR code in the image transmission apparatus in digital TV broadcasting according to the embodiment of the present invention.

In the present invention, the video decoder 340 restores the VIC as a QR (quick response) code and allows the QR code together with the image of the video data to be displayed on a screen. Examples of the restored QR codes are illustrated in FIGS. 7A and 7B and FIGS. 8A and 8B.

Figure 7A:
FIGS. 7A and 7B are views illustrating an example of screens of a QR code restored by using DEHA software according to the embodiment of the present invention.
Figure 7B:

FIGS. 7A and 7B are views illustrating an example of screens of a QR code restored by using DEHA software according to the embodiment of the present invention.

Figure 8A:
FIGS. 8A and 8B are views illustrating an example of screens of recognizing the QR code from the screen of FIG. 7B by a smart phone and displaying a result of QR analysis.
Figure 8B:
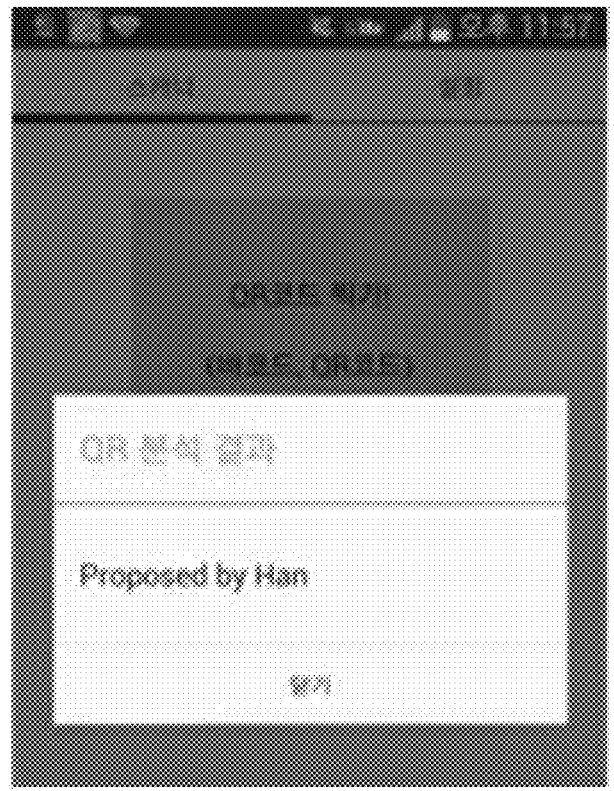

FIGS. 8A and 8B are views illustrating an example of screens of recognizing the QR code from the screen of FIG. 7B by a smart phone and displaying a result of QR analysis.

In order to evaluate a data transmission method using an extended border area of a full HD image according to the present invention, MSSG software is modified, and a full HD image as a test image recommended by VQEG (Video Quality Expert Group) is compressed, and an experiment is performed in a test bed using a virtual broadcasting system.

First, an MPEG-2MP@HL software encoder of MSSG is modified by using data of a QR code as an extended boarder area, and an image is compressed. Next, the compressed image is restored by using a software decoder including the MSSG decoder and the border extender. The restored image is illustrated in FIGS. 6A and 6B.

Figure 6A:
FIGS. 6A and 6B are views illustrating an example of screens of an image restored by using DEHA software according to an embodiment of the present invention.
Figure 6B:

FIGS. 6A and 6B are views illustrating an example of screens of an image restored by using DEHA software according to an embodiment of the present invention.

The qualities of compressed images may be changed according to various border extension schemes, and the qualities of images may be deteriorated according to the scheme proposed in the present invention. The qualities of compressed images according to various boarder extension schemes were compared. As a result, due to various methods for preventing a deterioration of in quality of image, the quality of image of the proposed scheme was maintained to be equal to those of various border extension schemes. The comparison is illustrated in FIG. 9.

Figure 9:
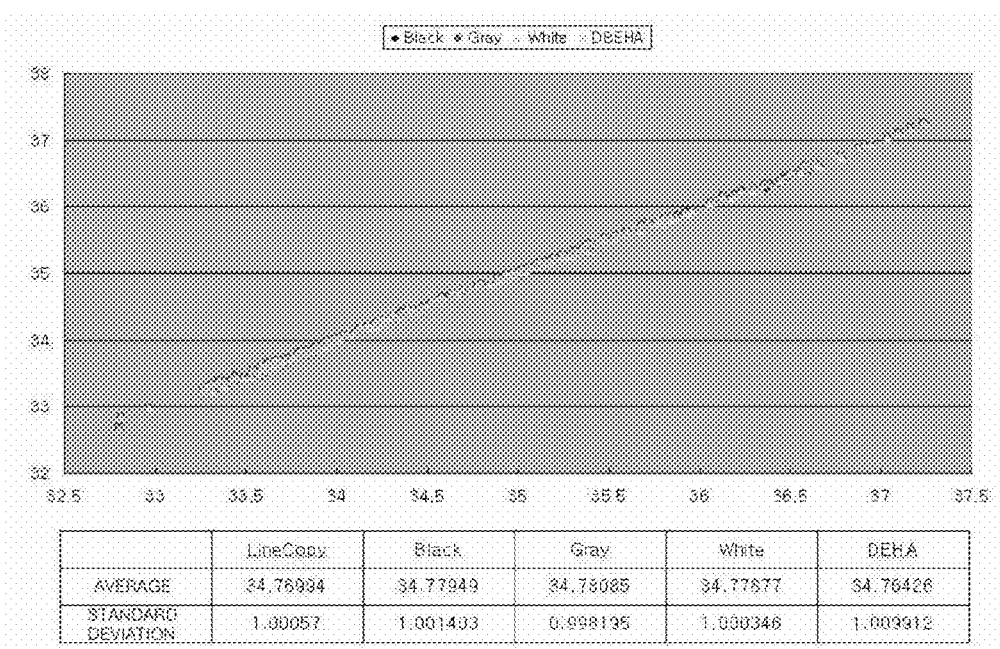
FIG. 9 is a diagram illustrating a graph and table of comparison of various border extension schemes and qualities of compressed images.

FIG. 9 is a diagram illustrating a graph and table of comparison of various border extension schemes and qualities of compressed images.

FIG. 9 illustrates border extension schemes Line Copy, Black, Gray, White, and DEHA and qualities of compressed images.

Hereinbefore, several exemplary embodiments of the present invent are described, but the present invention is analyzed in a limitative sense. It will be understood by the ordinarily skilled in the art that various changes in form and details may be made therein without departing from the spirit and scope of the present invention as defined by the appended claims.

What is claimed is:

1. An image transmission apparatus in digital TV broadcasting, comprising:
   a first converter which converts added data, which are to be inserted into an image, into a pixel block, wherein the added data are VIC (video information copyright);
   a border extender which adds an extended border area to an image area to extend the image in video data and inserts the converted added data into the extended border area, wherein the image is a full HD TV (high definition television) image and wherein the extended border area is a DEHA (DTV Extended border and Hidden Area);
   a video encoder which encodes the video data into which the border extender inserts the added data;
   a video decoder which decodes the video data encoded by the video encoder; and
   a second converter which converts the added data which are inserted as a pixel block in the video data decoded by the video decoder into original data.

2. The image transmission apparatus according to claim 1, wherein the video encoder encodes the video data according to an MPEG2MP@HL scheme, and the video decoder decodes the video data according to the MPEG2MP@HL scheme.

3. The image transmission apparatus according to claim 1, wherein the video encoder encodes the video data in an H.264 scheme, and the video decoder decodes the video data in the H.264 scheme.

4. The image transmission apparatus according to claim 1, wherein the border extender adds an extended border area under the image area.

5. The image transmission apparatus according to claim 1, wherein the video decoder restores the VIC as a QR (quick response) code and allows the QR code together with the image of the video data to be displayed on a screen.

* * * * *